(12) United States Patent
Troia et al.

(10) Patent No.: US 11,628,788 B2
(45) Date of Patent: Apr. 18, 2023

(54) VEHICLE ACCIDENT MANAGEMENT USING PEER-TO-PEER NETWORKS AND SYSTEMS

(71) Applicant: Micron Technology, Inc., Boise, ID (US)

(72) Inventors: Alberto Troia, Munich (DE); Antonino Mondello, Messina (IT)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/363,069

(22) Filed: Mar. 25, 2019

(65) Prior Publication Data

US 2020/0307480 A1    Oct. 1, 2020

(51) Int. Cl.
| | | |
|---|---|---|
| *B60R 21/01* | (2006.01) | |
| *H04W 4/40* | (2018.01) | |
| *H04L 67/104* | (2022.01) | |
| *B60R 21/00* | (2006.01) | |

(52) U.S. Cl.
CPC ............ *B60R 21/01* (2013.01); *H04L 67/104* (2013.01); *H04W 4/40* (2018.02); *B60R 2021/0027* (2013.01)

(58) Field of Classification Search
CPC .. B60R 21/01; B60R 2021/0027; H04W 4/40; H04L 67/104
See application file for complete search history.

(56) References Cited

U.S. PATENT DOCUMENTS

| | | | | |
|---|---|---|---|---|
| 10,666,767 B1 | * | 5/2020 | Floyd | .............. H04L 67/10 |
| 10,719,501 B1 | * | 7/2020 | Leise | .............. G06F 16/9024 |
| 2013/0300552 A1 | * | 11/2013 | Chang | .............. B60Q 9/00 |
| | | | | 340/436 |
| 2017/0178513 A1 | | 6/2017 | Davis et al. | |
| 2018/0018723 A1 | * | 1/2018 | Nagla | .............. H04L 63/08 |

(Continued)

FOREIGN PATENT DOCUMENTS

| | | |
|---|---|---|
| CN | 106209877 | 12/2016 |
| KR | 20180107339 A | 10/2018 |
| WO | 2013071949 A1 | 5/2013 |

OTHER PUBLICATIONS

International Search Report and Written Opinion, PCT/US2020/021373, dated Jul. 2, 2020.

(Continued)

*Primary Examiner* — Hongmin Fan

(74) *Attorney, Agent, or Firm* — Greenberg Traurig

(57) ABSTRACT

Computing nodes in a peer-to-peer network that can receive data about an accident in response to a vehicle having an accident. A computing device in the peer-to-peer network can generate a record of the data and store, in persistent storage, a copy of the record. The computing device can also transmit the record, via peer-to-peer connections, to other computing nodes in the network. The nodes in the network, when receiving the record, can each store a copy of the record and broadcast the record to one or more additional computing nodes in the network to cause the one or more additional computing nodes to store one or more additional copies of the record. Also, in response to an inquiry about the accident, the node can provide the record. And the node can participate in a determination of a network consensus in the network about validity of the record.

20 Claims, 9 Drawing Sheets

(56) References Cited

U.S. PATENT DOCUMENTS

| | | | |
|---|---|---|---|
| 2018/0158036 A1* | 6/2018 | Zhou | G09C 5/00 |
| 2018/0293576 A1 | 10/2018 | Song et al. | |
| 2018/0342036 A1 | 11/2018 | Zachary | |
| 2019/0036705 A1 | 1/2019 | Meriac et al. | |
| 2019/0141045 A1* | 5/2019 | Stocker | H04L 9/3247 |
| 2019/0279750 A1* | 9/2019 | Wang | G16H 10/60 |
| 2019/0287200 A1* | 9/2019 | Schuler | G06F 16/27 |
| 2019/0370760 A1* | 12/2019 | Kundu | G07C 5/0841 |
| 2019/0377336 A1* | 12/2019 | Avery | G05D 1/021 |
| 2019/0385269 A1* | 12/2019 | Zachary | G07C 5/008 |

OTHER PUBLICATIONS

Cebe, Mumin, et al., "Block4Forensic: An Integrated Lightweight Blockchain Framework for Forensics Applications of Connected Vehicles." Cornell University, Feb. 2, 2018.

Extended European Search Report, EP20779087.4, dated Nov. 2, 2022.

\* cited by examiner

500

---

Computing device of a vehicle receives data stored in memory of an EDR of the vehicle or a data storage device communicatively coupled to the EDR
502

↓

The computing device selects certain parts of the received data according to the size of each part of the certain parts
504

↓

The computing device sends, over a communications network, the selected parts of the data to a computing node in a peer-to-peer network of computing nodes
506

FIG. 5

| Traffic Control Device Communication | 600 |
|---|---|
| traffic control device's public identification | 606 |
| traffic control device's identification certificate | 604 |
| traffic control device's public key K$_{L2}$ | 602 |
| 612 | accident information |
| (optionally encrypted such as by using asymmetric cryptography) ||
| 610 | digital signature |
| (signed with traffic control device's private key KL2 and verified by computing node's public key KL2) ||

| Vehicle Communication | 700 |
|---|---|
| vehicle's public identification | 706 |
| vehicle's identification certificate | 704 |
| vehicle's public key K$_{L2}$ | 702 |
| 712 | accident information |
| (optionally encrypted such as by using asymmetric cryptography) ||
| 710 | digital signature |
| (signed with vehicle computing device's private key KL2 and verified by computing node's public key KL2) ||

VEHICLE ACCIDENT MANAGEMENT USING PEER-TO-PEER NETWORKS AND SYSTEMS

FIELD OF THE TECHNOLOGY

At least some embodiments disclosed herein relate to vehicle accident management systems in general, and more particularly to, but not limited to, vehicle accident sensing, recording, and reporting using peer-to-peer networks and systems.

BACKGROUND

Accident management can include the centralized management of claims following road traffic collisions. Such management can assist drivers in getting back on the road and in managing the claims process. Accident management encompasses many services, which can include vehicle recovery, vehicle replacement, damage assessment, arrangement of vehicle repairs, transacting with insurers, uninsured loss recovery, determining culpability, injury assistance, and help with documentation preparation. Accident management is particularly useful for vehicle fleet operators, who need to keep downtime of its vehicles to a minimum.

Peer-to-peer (P2P) computing or networking is a distributed application architecture that partitions tasks or workloads between peer computing devices. Peer computing devices can be equally privileged participants in the application. The peer computing devices are said to form a peer-to-peer network of nodes. Peer computing devices, which are independently operating devices with respect to each other, make a portion of their resources, such as processing power, disk storage or network bandwidth, directly available to other network participants without the need for central coordination by servers or other types of central computing devices.

A blockchain is a list of records that can grows with each transaction recorded to the chain. The records can be called blocks, and the blocks can be linked using cryptography. Each block can contain a cryptographic hash of the previous block, a timestamp, and transaction data which is usually represented as a Merkle Tree root hash. A blockchain can be resistant to modification of its data. For use as a distributed ledger, a blockchain can be managed by a peer-to-peer network collectively adhering to a protocol for inter-node communication and validating new blocks. Once recorded, the data in any given block cannot be altered retroactively without alteration of subsequent blocks, which requires some sort of consensus of the blockchain network.

BRIEF DESCRIPTION OF THE DRAWINGS

The present disclosure will be understood more fully from the detailed description given below and from the accompanying drawings of various embodiments of the disclosure.

FIG. 5 is a flow diagram of an example method performed by an example vehicle, in which the vehicle may or may not include a computing node of a peer-to-peer network, in accordance with some embodiments of the present disclosure.

FIG. 6 illustrates example data included in an example accident reporting communication sent from an example traffic control device, in accordance with some embodiments of the present disclosure.

FIG. 7 illustrates example data included in an example accident reporting communication sent from an example vehicle, in accordance with some embodiments of the present disclosure.

DETAILED DESCRIPTION

Figure 1:
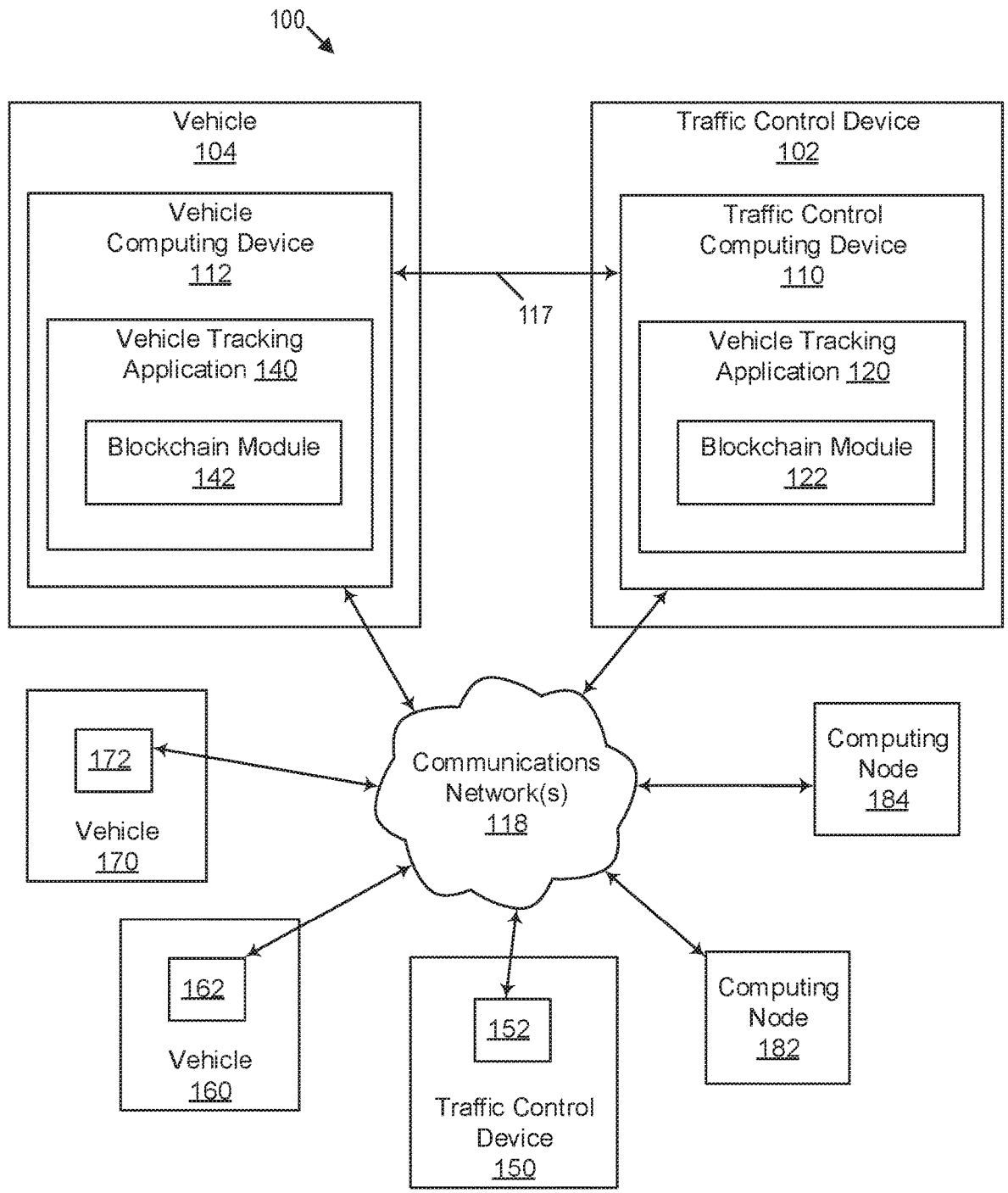
FIG. 1 illustrates an example computing system that can implement a vehicle accident management system for vehicle accident sensing, recording, and reporting using peer-to-peer networks and systems, in accordance with some embodiments of the present disclosure.

At least some aspects of the present disclosure are directed to vehicle accident management systems using peer-to-peer networks and systems, and specifically, in some embodiments, the systems include vehicle accident sensing, recording, and reporting using peer-to-peer networks and systems. In some examples, the systems use blocks of a blockchain to record information on instances of vehicle accidents.

The information about an accident can be collected from a black box of a vehicle in the accident and/or from other nearby machines such as other vehicles and traffic control devices. This collected information can then be communicated to a computing node of a peer-to-peer network implementing a blockchain ledger. The blockchain ledger can ensure that the accident data collected by the black box and/or other devices is recorded and not altered or destroyed after the accident.

Also, the blockchain can implement distribution of redundant copies to the computing nodes in an integrated way by cryptographically linking the records. The records can be linked by hashes of the records being included in at least the contents of subsequent records, such that altering a prior record can be easily detected by checking against its hash in the subsequent records. Validity can be checked against the copy and the hashes in the downstream records.

In some embodiments, to economize the use of the blockchain, hashes of accident data from the black box or another device can be used instead of the originally collected data collected from sensors and cameras sensing and observing the accident. Also, small data fields can be included in the record to minimize the use and growth in size of the blockchain ledger. Although, in some embodiments, entire sets of data from the black box and other observing devices can be offloaded to one or more servers and/or the blockchain.

In some embodiments, the systems can use asymmetric cryptography for message exchange between parties of the systems. The systems can use certificates based on asymmetric cryptography to show the identities of the devices of vehicles, traffic control devices, computing nodes in general, and other machines involved in the systems. Also, the systems can use a peer-to-peer network and system to maintain integrity of the message exchanges between parties of the systems. For example, a blockchain network and system can be used by some examples of the systems.

The messages exchange between these parties is a process that can be secured via a device identity composition system. The transaction records, accident data, and/or statuses resulting from the message exchange can be stored on blockchain in some embodiments. Thus, the integrity of the records is protected by blockchain. Asymmetric cryptography can be used for mutual authentication between accident observing parties and data recording parties, which can be found in the implementation of the certificates, digital signatures on the exchanged messages, and/or the device identity composition system. Each party has a public key of the other party from the mutual authentication. Both parties can accept each other's certificate where there is a subscription activated for example.

Also, one or more ledgers (such as one or more blocks of a blockchain) can be used to record messages exchanged between parties. For example, each observing party and/or data recording party can have its own ledger associated with it. Each ledger can be implemented by a blockchain, so that each recorded message in the ledger can maintain its integrity through the hashing features of blocks of a blockchain.

FIG. 1 illustrates an example computing system 100 that can implement a vehicle accident management system for vehicle accident sensing, recording, and reporting using peer-to-peer networks and systems, in accordance with some embodiments of the present disclosure. The system 100 includes at least a traffic control device 102, a vehicle 104, one or more communications networks 118, additional vehicles (e.g., vehicles 160 and 170), an additional traffic control device 150, and at least two typical computing nodes of a peer-to-peer network (e.g., computing nodes 182 and 184). The traffic control device 102 includes at least a traffic control computing device 110 having a vehicle tracking application 120 that includes blockchain module 122 that can perform at least some of the operations described herein such as at least some of the method steps of method 400. The vehicle 104 includes at least a vehicle computing device 112 having a vehicle tracking application 140 that includes blockchain module 142 that can perform at least some of the operations described herein such as at least some of the method steps of methods 400 and 500. The communications network(s) 118 includes at least a wide area network (WAN), a local area network (LAN), an intranet, an extranet, the Internet, and/or any combination thereof.

Each of the vehicles 160 and 170 includes parts of vehicles such as the illustrated computing devices 162 and 172. Traffic control device 150 also includes a computing device 152 as well as other parts of traffic control device. The computing devices described herein (such as computing devices 110, 112, 152, 162, and 172) and the example typical computing nodes of the peer-to-peer network, computing nodes 182 and 184, and/or any other computer system or computing machine described in can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated for each of the illustrated computing devices of FIG. 1 and the computing nodes 182 and 184, the term "machine" shall also be taken to include any collection of machines that individually or jointly execute a set (or multiple sets) of instructions to perform any one or more of the methodologies or operations discussed herein. And, each of the illustrated computing devices of FIG. 1 (and other computing devices described herein) and the computing nodes 182 and 184 can each include at least a bus and/or motherboard, one or more controllers (such as one or more CPUs), a main memory that can include temporary data storage, at least one type of network interface, a storage system that can include permanent data storage, and/or any combination thereof.

The blockchain modules 122 and 142 can also be configured to generate a new block of the blockchain (e.g., new block 802 of blockchain 800). The blockchain modules can also record, to the new block of the blockchain, accident information. The blockchain modules can also record temporal information related to the accident as well as digital signatures from accident observing parties such as black box recorders and traffic control devices. The blockchain modules can also generate and record, to the new block, a hash of all data recorded to the blockchain that includes a hash of the recorded data of the new block and a hash of all data recorded to blocks of the blockchain prior to generation of the new block. And, the blockchain modules can generate and record, to the new block, the hash of all data recorded to blocks of the blockchain prior to generation of the new block. Also, the blockchain modules can broadcast the recorded data of the new block into a peer-to-peer network. In some embodiments, the computing devices 110 and 112 can be peer nodes in the peer-to-peer network, and in such embodiments the blockchain modules can further include storing, by a storage system (e.g., storage systems 212 312), copies of the recorded data of the new block.

Also, for example, the peer-to-peer network can include various computing nodes, such as nearby vehicles, vehicles of a common brand, vehicles of a club or fleet, computing nodes arranged along the roads (e.g., like base stations for cellular communications and can be integrated or connected with the base stations), servers of vehicle manufactures, deals, insurance providers, etc., and mobile devices of drivers, passengers, bystanders, emergency response team, etc. Once a record is in the blockchain, it can be very difficult to cover up or alter aspects of an accident.

Figure 2:
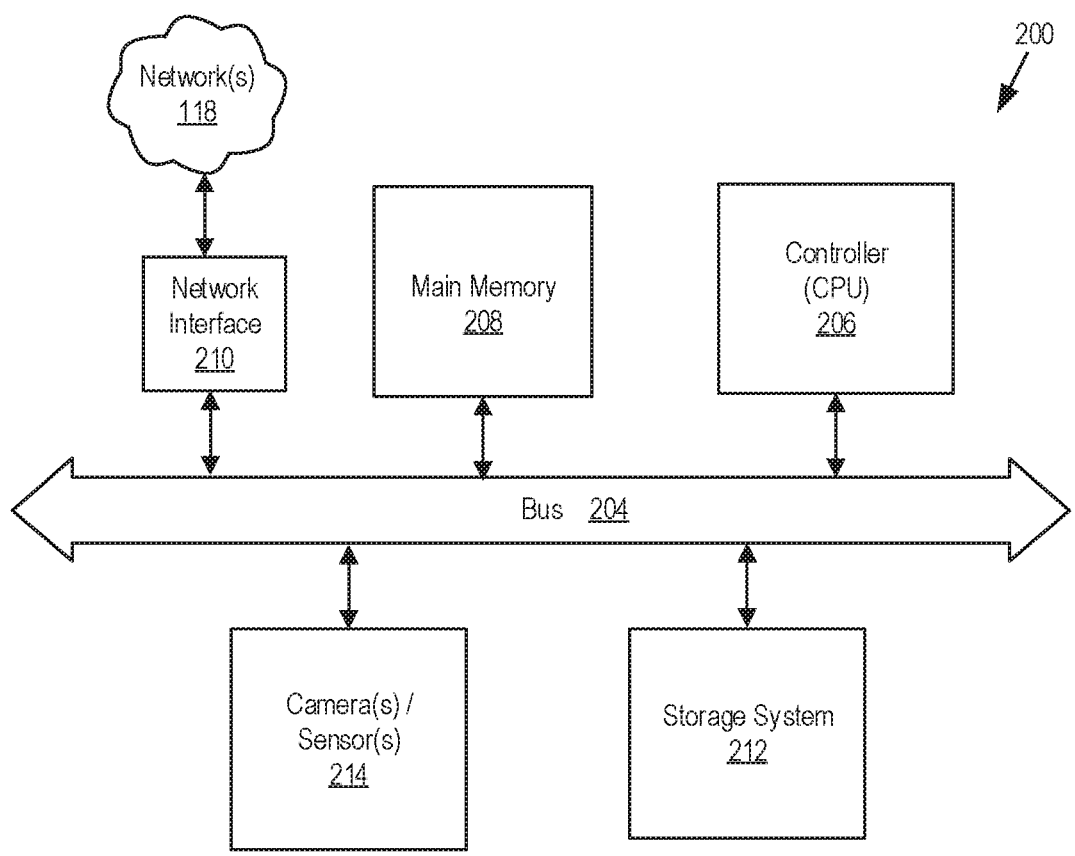
FIG. 2 illustrates example parts of an example traffic control device, in accordance with some embodiments of the present disclosure.

FIG. 2 illustrates example parts of an example traffic control device 200, in accordance with some embodiments of the present disclosure. The traffic control device 200 can be communicatively coupled to the network(s) 118 as shown. In some embodiments, traffic control device 200 is the traffic control device 102 or 150 illustrated in FIG. 1 or any other traffic control device that is in accordance with some embodiments of the present disclosure. The traffic control device 200 includes at least a bus 204, a controller 206 (such as a CPU), a main memory 208, a network interface 210, a data storage system 212, and one or more cameras and/or one or more sensors 214. The one or more cameras and/or one or more sensors 214 can include any known camera or sensor used with or installed in traffic control devices.

The traffic control device 200 can include or be any known traffic control device such as any known or foreseeable markers, signs and signal devices used to inform, guide and control traffic, including pedestrians and vehicles. These devices are usually placed adjacent, over or along the highways, roads, traffic facilities and other public areas that require traffic control. For example, the traffic control device 200 can be or include a traffic light.

The bus 204 communicatively couples the controller 206, the main memory 208, the network interface 210, the data storage system 212, and the one or more cameras and/or one or more sensors 214, and all of these parts can be part of a traffic control computing device (such as traffic control computing device 110). The traffic control device 200 includes a computer system that includes at least controller 206, main memory 208 (e.g., read-only memory (ROM), flash memory, dynamic random access memory (DRAM) such as synchronous DRAM (SDRAM) or Rambus DRAM (RDRAM), static random access memory (SRAM), etc.), and data storage system 212, which communicate with each other via bus 204 (which can include multiple buses).

To put it another way, FIG. 2 is a block diagram of an example traffic control device 200 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 210) to other machines in a LAN, an intranet, an extranet, and/or the Internet (e.g., network(s) 118). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 206 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 206 can also be one or more special-purpose processing devices such as an application specific integrated circuit (ASIC), a field programmable gate array (FPGA), a digital signal processor (DSP), network processor, or the like. Controller 206 is configured to execute instructions for performing the operations and steps discussed herein. Controller 206 can further include a network interface device such as network interface 210 to communicate over one or more communications network (such as network(s) 118).

The data storage system 212 can include a machine-readable storage medium (also known as a computer-readable medium) on which is stored one or more sets of instructions or software embodying any one or more of the methodologies or functions described herein. The instructions can also reside, completely or at least partially, within the main memory 208 and/or within the controller 206 during execution thereof by the computer system, the main memory 208 and the controller 206 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Figure 3:
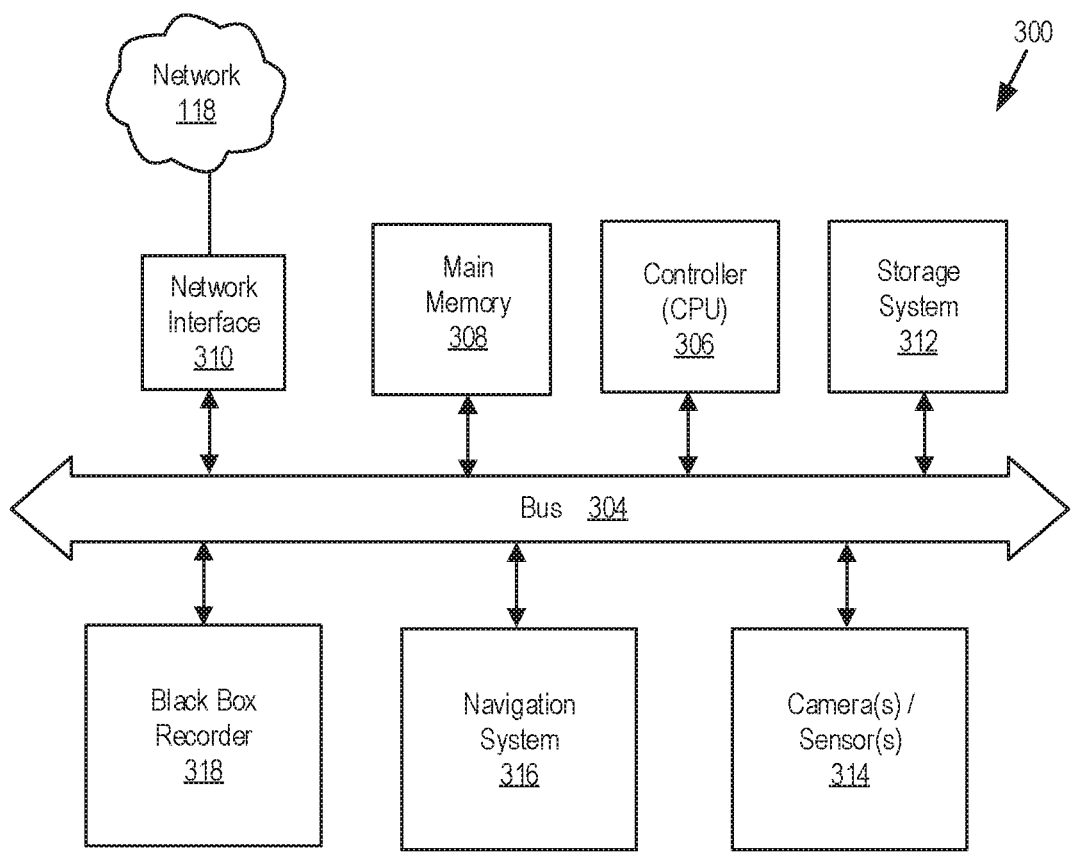
FIG. 3 illustrates example parts of an example vehicle, in accordance with some embodiments of the present disclosure.

FIG. 3 illustrates example parts of an example vehicle 300, in accordance with some embodiments of the present disclosure. The vehicle 300 can be communicatively coupled to the network(s) 118 as shown. In some embodiments, vehicle 300 is the vehicle 104 or any of the other vehicles illustrated in FIG. 1. Vehicle 300 includes at least a bus 304, a controller 306 (such as a CPU), a main memory 308, a network interface 310, a storage system 312, one or more cameras and/or one or more sensors 314, navigation system 316, and black box recorder 318.

The bus 304 communicatively couples the controller 306, the main memory 308, the network interface 310, the data storage system 312, the one or more cameras and/or one or more sensors 314, the navigation system 316, and the black box recorder 318, and all of these parts can be part of a vehicle computing device (such as vehicle computing device 112). The vehicle 300 includes a computer system that includes at least controller 306, main memory 308 (e.g., read-only memory (ROM), flash memory, dynamic random access memory (DRAM) such as synchronous DRAM (SDRAM) or Rambus DRAM (RDRAM), static random access memory (SRAM), etc.), and data storage system 312, which communicate with each other via bus 304 (which can include multiple buses).

To put it another way, FIG. 3 is a block diagram of an example vehicle 300 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 310) to other machines in a LAN, an intranet, an extranet, and/or the Internet (e.g., network(s) 118). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 306 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 206 can also be one or more special-purpose processing devices such as an application specific integrated circuit (ASIC), a field programmable gate array (FPGA), a digital signal processor (DSP), network processor, or the like. Controller 306 is configured to execute instructions for performing the operations and steps discussed herein. Controller 306 can further include a network interface device such as network interface 310 to communicate over one or more communications network (such as network(s) 118).

The data storage system 312 can include a machine-readable storage medium (also known as a computer-readable medium) on which is stored one or more sets of instructions or software embodying any one or more of the methodologies or functions described herein. The instructions can also reside, completely or at least partially, within the main memory 308 and/or within the controller 306 during execution thereof by the computer system, the main memory 308 and the controller 306 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The navigation system 316 can include any known navigation system used with or installed in vehicles, such as a system that includes a GPS system. The one or more cameras and/or one or more sensors 314 can include any known camera or sensor used with or installed in vehicles. For example, the camera(s)/sensor(s) 314 can include any camera or sensor used by autonomous vehicles. The vehicles mentioned herein can include autonomous vehicles that can include many sensors to assist in controlling an autonomous vehicle. In the case of an accident, collision, or near collision involving the vehicle, there can be a benefit from reviewing camera and sensor data recorded just prior to and/or during the accident to assist in potentially determining the cause of the accident, and/or whether there may have been a vehicle failure. However, in the event of a power loss during the accident, vehicle camera and sensor data stored in a volatile memory can be lost. An event data recorder (EDR), also known as a black box recorder, can be included with the vehicle to overcome the aforesaid problem, e.g., see black box recorder 318 shown in FIG. 3. The black box recorder 318 is a device that can be installed in the vehicle 300 to record information related to vehicle crashes or accidents. In one example, automobile original equipment manufacturers (OEMs) that manufacture autonomous vehicles can install a black box recorder, such as recorder 318, that can record a certain period of time before an accident occurs such as the last 30 seconds before an accident occurs. It is intended that this data be used to reproduce the root cause of the accident, for example.

The information sent from the black box recorder 318 to the computing nodes of the blockchain network can include priority and/or smaller sized data. The black box recorder can include predefined types of data for a predefined period of time such that the data can be later reviewed to study the accident in depth. Since there is value in entire datasets, especially with accident related datasets, initially information recorded by the black box recorder can include unfiltered data. But, before sending the information to a computing node for recording in a blockchain, it is beneficial to filter the data or select data that is inherently smaller but still valuable for an accident ledger. For example, identity data has a small size and can be useful. Also, the hash of data stored in the computing device or the black box recorder can be also small. Further, the vehicle status information at the time of accident (e.g., speed, direction, vehicle controller) can also small. Some of the temporal information, especially such information for a period of time leading to the accident can be bigger; and the camera images can be much bigger. Thus, in some embodiments, such information is filtered before being sent to a recording computing node. Or, such information including larger types of data is not sent at all. Also, verification of digital signature for the observing device sending information to be record in a block can occur before the information is sent or at least before the block is generated with the information. Also, verification of a digital signature to add to the block can be criteria consider before generating the block. This criterion can be used in conjunction with other criteria described herein for determining whether to generate the block and/or verification of the condition of hashes with an already generated block.

Respective control lines (such as buses 204 and 304) can operate different parts of vehicles and traffic control devices. The control lines can be one or more control lines that directly link computing devices such as the computing devices illustrated in FIG. 1 (e.g., see control line 117 depicted in FIG. 1). Also, network connections can link the computing devices through one or more communications networks such as network(s) 118.

The peer-to-peer network of some embodiments can be a collection of nodes and peer-to-peer connections. For example, computing nodes 182 and 184 illustrated in FIG. 1 can be a node of a peer-to-peer network supported by computing devices connected through network(s) 118. In some embodiments, computing devices other than the computing devices of the vehicles and traffic control devices are the nodes of the peer-to-peer network. Alternatively, the computing devices of the traffic control devices and/or the vehicles can be nodes of the peer-to-peer network. In some embodiments, computing devices other than the computing devices of the vehicles and traffic control devices as well as the computing devices of traffic control devices and/or vehicles are the nodes of the peer-to-peer network. For example, the respective computer system of traffic control device 200 and vehicle 300 can be nodes of a peer-to-peer network. The network can include a peer-to-peer network that can support a blockchain. In other words, vehicles and/or the traffic control devices may or may not be in the peer-to-peer network such as the peer-to-peer network that implements the blockchain—depending on the embodiment.

Figure 4:
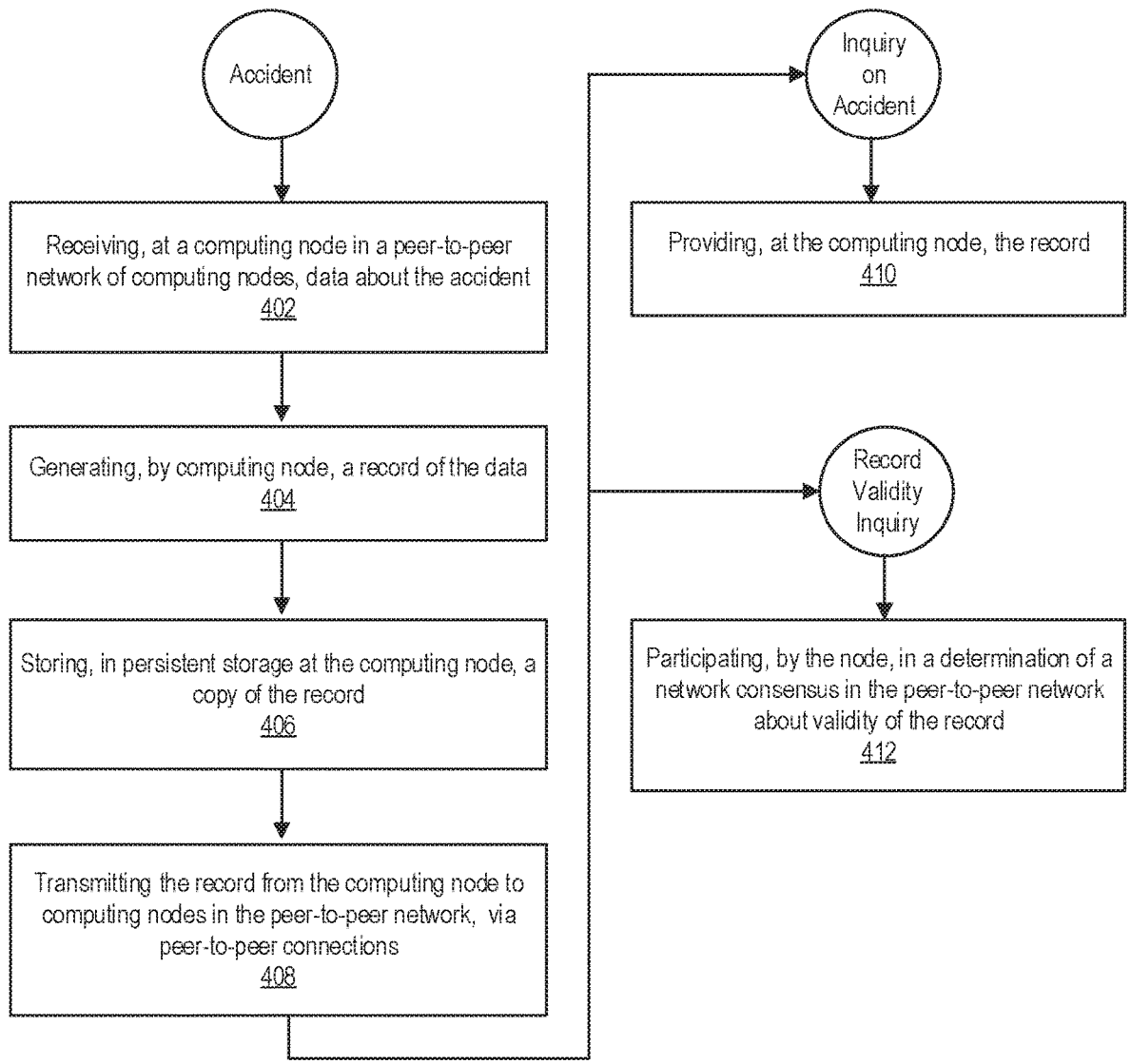
FIG. 4 is a flow diagram of an example method performed by an example computing node of a peer-to-peer network, in accordance with some embodiments of the present disclosure.

FIG. 4 is a flow diagram of an example method 400 performed by example parts of an example traffic control device (such as traffic control device 102, 150, or 200), an example vehicle (such as vehicle 104, 160, or 170), and/or an example computing node of a peer-to-peer network (such as computing node 182 or 184), in accordance with some embodiments of the present disclosure. The method 400 begins at step 402, in response to a vehicle that had or is having an accident, receiving, at a computing node in a peer-to-peer network of computing nodes, data about the accident. The receiving of the data, at the computing node, can include receiving the data over a communications network.

The data can be collected by the vehicle that had or is having an accident or another party. Also, data can be collected by the vehicle or another party just before the accident occurs. The vehicle that had or is having an accident can include the computing node that performs step 402 or any of the other steps of method 400. Alternatively, the receiving the data, at the computing node, can include receiving the data over a communications network from the vehicle. In such an example, the vehicle may or may not include a node in the peer-to-peer network.

Also, the data can be collected by a machine external of the vehicle (such as a traffic control device near the vehicle, e.g., traffic control device 102, 150, or 200). The machine can include the computing node performing the steps of method 400 or another node of the peer-to-peer network. Also, the machine can be another vehicle in the accident.

The receiving the data, at the computing node, can include receiving the data over a communications network from the machine. In some embodiments, the data is collected by the vehicle, another vehicle, the machine including the computing node, and/or another machine external of the vehicle.

At step 404, the computing node generates a record of the data. At step 406, the computing node stores, in persistent storage at the computing node, a copy of the record.

At step 408, the computing node transmits the record from the computing node via peer-to-peer connections to computing nodes in the peer-to-peer network. When receiving the record, each of the computing nodes in the peer-to-peer network is configured to store a copy of the record and broadcast the record to one or more additional computing nodes in the peer-to-peer network to cause the one or more additional computing nodes to store one or more additional copies of the record.

At step 410, in response to an inquiry about the accident, the computing node provides the record. At step 412, in response to an inquiry regarding the validity of the record, the computing node participates in a determination of a network consensus in the peer-to-peer network about validity of the record. Each of the computing nodes in the peer-to-peer network is configured to determine a vote for a validity of the record based on copies of records in that each computing node. The validity of the record is determined based on the votes. Each of the computing nodes in the peer-to-peer network is configured to determine a vote for a validity of the second record based on copies of records in that each computing node. And, the validity of the second record is determined based on the votes. The validity of the second record can be determined based on a majority of the votes. The validity of the second record can also be determined based on the votes reaching a number that exceeds a threshold number of nodes confirming the validity of the second record. The validity of the record can be determined based on a majority of the votes. The validity of the record can be determined based on the votes reaching a number that exceeds a threshold number of nodes confirming the validity of the record.

The validity of the first and/or second records, or any block of the block chain, can be further validated according to a verification of a digital signature in the record or block. This criterion can be used in conjunction the other criteria described herein or alone in some embodiments. Also, condition of the hashes of the block can be another factor for determining the validity of the record or block. A benefit of such criteria is that a block creator cannot deny being the creator. In some embodiments, a block is recognized to be part of the blockchain if (1) it was generated from an authorized host who has a verified signature (such as verified by one or more nodes of the peer-to-peer network) and (2) the hash of the previous block matches the hash of the current block.

In cases with the external machine being another vehicle in the accident, the record can be a first record. In such cases, the computing node performing the steps of process 400 can be a first computing node. And, the vehicle can be the first computing node and the other vehicle in the accident can include the second computing node in the peer-to-peer network. In such an example, the method 400 can further include receiving, at the second computing node, second data about the accident (at step 402). The method can also include generating, in the second computing node, a second record of the second data (at step 404). And, the method can further include storing, in persistent storage at the second computing node, a copy of the second record (at step 406). At step 408, the second computing node transmits the second record via peer-to-peer connections to computing nodes in the peer-to-peer network. Each of the computing nodes in the peer-to-peer network is also configured to store a copy of the second record and broadcast the second record to one or more additional computing nodes in the peer-to-peer network to cause the one or more additional computing nodes to store one or more additional copies of the second record. Also, at step 410, in response to an inquiry about the accident, the second node provides the second record. And, at step 412, the second node participates in a determination of a network consensus in the peer-to-peer network about the second record.

In some embodiments, at least part of the received data is derived from or includes data collected by the vehicle and stored in memory of an event data recorder (EDR) of the vehicle or a data storage device communicatively coupled to the EDR before the accident. In some embodiments, the data about the accident can be a preselected subset of data from a larger dataset, and the selection of certain parts of the larger dataset for the preselected subset can be according to the size of each one of the certain parts being below a predetermined size threshold. Also, the data about the accident can be a preselected subset of data from a larger dataset of data stored in memory of an EDR of the vehicle or a data storage device communicatively coupled to the EDR before the accident. And, the selection of certain parts of the larger dataset for the preselected subset can be according to the size of each one of the certain parts being below a predetermined size threshold that is determined during the configuration of the EDR.

FIG. 5 is a flow diagram of an example method 500 performed by example parts of an example vehicle (such as vehicle 104, 160, or 170), in accordance with some embodiments of the present disclosure. The method 500 begins, at step 502, with receiving, by a computing device of a vehicle, data stored in memory of an EDR of the vehicle or a data storage device communicatively coupled to the EDR.

At step 504, the computing device selects certain parts of the received data according to the size of each part of the certain parts. In some embodiments, the receiving of the stored data by the computing device of the vehicle only occurs when the computing device predicts that the vehicle is about to be in an accident, when the computing devices determines that the vehicle is in an accident, or when the computing device determines that the vehicle has been in an accident within a predetermined period of time.

At step 506, the computing device sends, over a communications network, the selected parts of the data to a computing node in a peer-to-peer network of computing nodes. This can initiate the computing node of the network to generate a record of the selected parts of the data (such as at step 404 depicted in FIG. 4) and store, in persistent storage, a copy of the record (such as at step 406). The computing node is then configured to transmit the record via peer-to-peer connections to computing nodes in the peer-to-peer network at will or upon requests by the computing nodes.

With respect to the method 400, method 500, or any other method, process, or operation described herein, in some embodiments, a non-transitory computer-readable storage medium stores instructions that, when executed by at least one processing device (such as controller 206 or controller 306), cause the at least one processing device to perform the method 400, method 500, or any other method, process, or operation described herein, and/or any combination thereof.

Also, for example, some embodiments can include a non-transitory computer-readable storage medium tangibly encoded with computer-executable instructions, that when executed by a processor of a computing node in a peer-to-peer network of computing nodes, causes the processor to perform a method. Such a method can include, in response to a vehicle having an accident, receiving data about the accident. The method can also include generating a record of the data and storing, in persistent storage at the computing node, a copy of the record. The method can also include transmitting the record from the computing node via peer-to-peer connections to computing nodes in the peer-to-peer network. When receiving the record, each of the computing nodes in the peer-to-peer network can be configured to store a copy of the record and broadcast the record to one or more additional computing nodes in the peer-to-peer network to cause the one or more additional computing nodes to store one or more additional copies of the record. Also, in response to an inquiry at the computing node, by a requester, about the accident, the method can include providing the record to the requester. Also, in response to such an inquiry, the method can include participating in a determination of a network consensus in the peer-to-peer network about the record, wherein a processor of each of the computing nodes in the peer-to-peer network can be configured to determine a vote for a validity of the record based on copies of records in that each computing node, and wherein the validity of the record can be determined based on the votes.

FIG. 6 illustrates example data included in an example accident reporting communication sent from an example traffic control device (traffic control device communication 600), in accordance with some embodiments of the present disclosure. And, FIG. 7 illustrates example data included in an example accident reporting communication sent from an example vehicle (vehicle communication 700), in accordance with some embodiments of the present disclosure.

Asymmetric cryptography can be used for mutual authentication between a party observing and reporting a vehicle accident (such as a traffic control device or a vehicle) and a party recording the reporting to a block of a blockchain (such as a computing node of a peer-to-peer network), which can be found in the implementation of the certificates, digital signatures on the exchanged messages, and/or the device identity composition system (such as shown by the traffic control device communication illustrated in FIG. 6 and the vehicle communication illustrated in FIG. 7). Each of the traffic control computing device and the vehicle computing device has a public key (e.g., public keys 602 and 702) of the other party from the mutual authentication. Both parties can accept each other's certificate (e.g., certificates 604 and 704) where there is a subscription activated for example, such as a subscription to the vehicle accident management system.

The exchanging of the certificates can confirm each identity (e.g., identities 606 and 706) and that the parties know each other as well as confirm that a subscription exists amongst the parties. A subscription is not necessarily a prerequisite for handshaking certificate between the parties.

The messages exchange between the parties is a process that can be secured via a device identity composition system. The device identity composition system can be used for the asymmetric cryptography. In such embodiments, the private key (e.g., private key 608 or 708) can be or can be based on a secret value called Unique Device Secret (UDS) that is injected during manufacture of a computing device. In some example implementations of the device identity composition system, a UDS can only ever exist within the computing device on which it was provisioned.

In some embodiments, the device identity composition system can include layer $L_0$ that derives $K_{L0}$, the Fuse Derived Secret (FDS), by using a key derivative function (KDF). Algorithmically, $K_{L0}$=KDF [UDS, HASH("Identity of $L_1$")] (e.g., see the private key $K_{L2}$ referred to in FIGS. 6 and 7). The other layers (Lk) can provide to the next ones ($L_{k+1}$) a set of keys and certificates (e.g., see the public key $K_{L2}$ referred to in FIGS. 6 and 7). The layers being layers of a device architecture starting with the immutable loader $L_0$, then the device identity composition system core $L_1$, application firmware $L_2$, operating system and applications $L_{k+1}$. Each layer can provide integrity for the next layer and so on. And, each layer can verify the certificates showing identities of the devices of the parties exchanging information.

In some embodiments, asymmetric cryptography is used for mutual authentication between the parties. The mutual authentication can occur over a communications network or a direct link and can be initiated by the parties exchanging respective public key certificates, which include digital signatures for mutual authentication (e.g., see respective digital signatures 610 and 710 of communications 600 and 700). The initiating of mutual authentication can occur after an accident, so that observing and involved parties can exchange information securely. The information exchanged can include accident information such as information on physical events just before, just after, and during an accident, temporal data associated with the physical events, driver information, vehicle and/or environmental conditions before, just after, and during an accident, and status information on aspects of the vehicle and nearby traffic control devices (e.g., see accident information 612 and 712 of communications 600 and 700). Parties can accept each other's certificate where there is a subscription activated. If a party is not subscribed to the system, then the party can proceed with providing certain information to subscribe (such as through public key encryption). Also, since each party has a public key of the other party from the mutual authentication, encrypted messages can be sent between the parties and each party can decrypt a message with its own private key (since this technology uses asymmetric cryptography).

In general, ownership of public keys is known to the public. If a public key can decrypt a message, it can be inferred that the message is encrypted using the corresponding private key. The message cannot be encrypted by the public key. If only a specific individual, vehicle or traffic control device has the private key, it can be inferred that the message is from the specific individual, vehicle or traffic control device. To be able to trust the inferred results, a trusted entity needs to certify that the public key does correspond to a private key held by the specific individual, vehicle, traffic control device, or computing node, so that the public key can be used to determine the identity of the individual, vehicle, traffic control device, or computing node.

Figure 8:
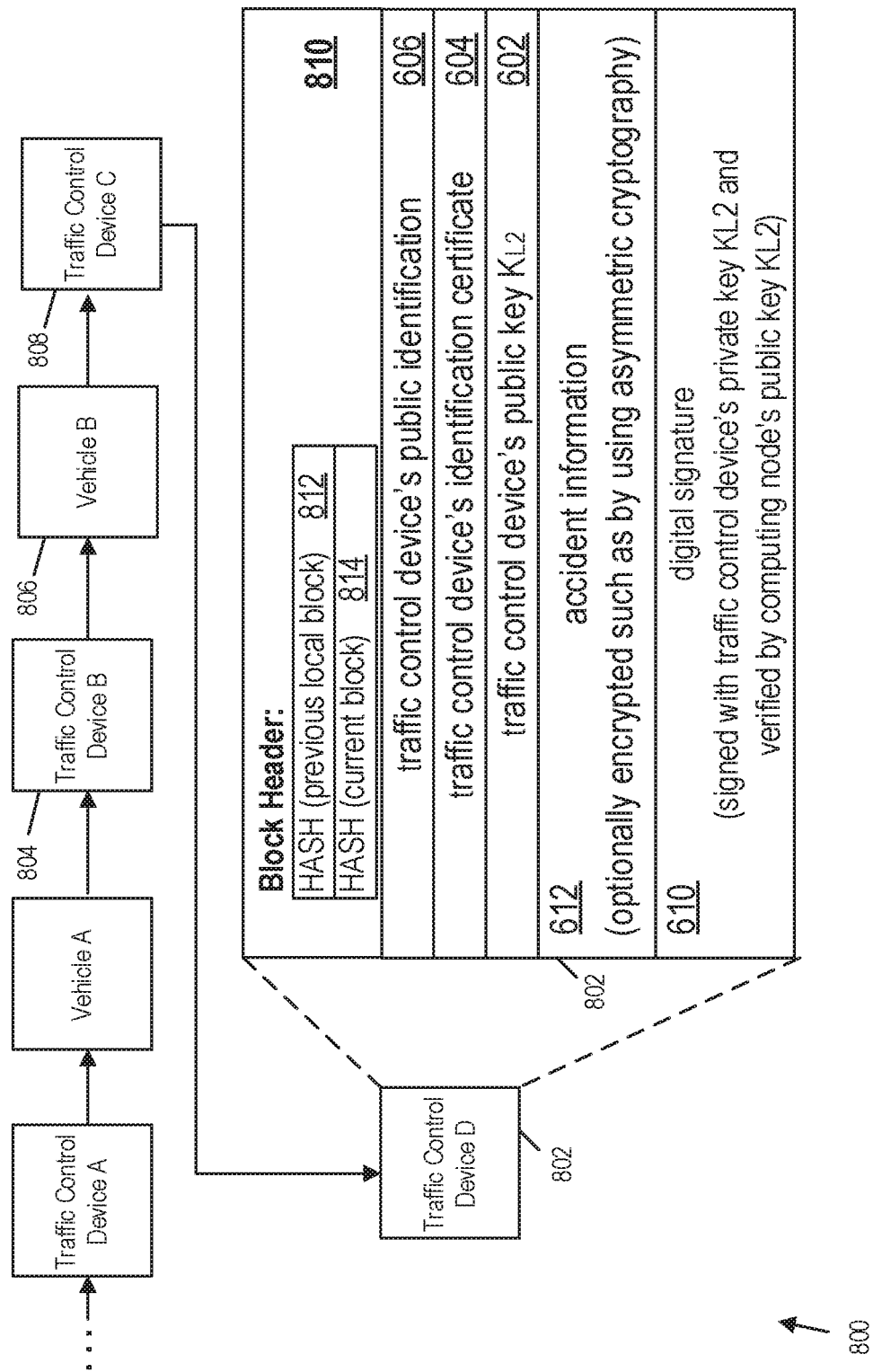
FIG. 8 illustrates a part of an example blockchain of blocks, wherein each block includes an accident reporting communication from a reporting party such as a reporting vehicle or a reporting traffic control device.

FIG. 8 illustrates a part of an example blockchain 800 of blocks, wherein each block includes an accident reporting communication from a reporting party such as a reporting vehicle or a reporting traffic control device. FIG. 8 illustrates a part of an example blockchain 800 of blocks (e.g., blocks 802, 804, 806, and 808), wherein each block includes a block header (e.g., see block header 810) and identifying information and information on an instance of an accident. As illustrated, each block of the part of the blockchain 800 was generated by or is at least associated with a first traffic control device identified as "Traffic Control Device A", a second traffic control device identified as "Traffic Control Device B", a third traffic control device identified as "Traffic Control Device C", a fourth traffic control device identified as "Traffic Control Device D", a first vehicle identified as "Vehicle A", and a second vehicle identified as "Vehicle B". It is to be understood for the purposed of this disclosure that the depiction of the blockchain 800 in FIG. 8 is only a partial depiction of the blockchain and that there may be many more traffic control devices and vehicles that generate or are at least associated with blocks of the blockchain that are not depicted in FIG. 8.

In general, the blockchain 800 can be or include a distributed "ledger" or database with duplicative copies of records stored independently on the nodes of the peer-to-peer network implemented the blockchain. In some embodiments, no centralized node is responsible for controlling and/or managing the entire blockchain. Each node can manage, validate its copies, and participate in the determination of blockchain network consensus.

Block 802 is depicted as exploded so that at least some of the content of block 802 are depicted. The exploded illustration of block 802 shows the block including a block header 810 that includes hashes 812 and 814. Hash 812 can be or include the hash of all data recorded to blocks of the entire blockchain prior to generation of the new block 802. Specifically, the new block 802 can be generated by the computing device of the traffic control device ("Traffic Control Device D") or by a computing node of a peer-to-peer network after the respective information derived by the traffic control device ("Traffic Control Device D") has been received by the computing node. Hash 814 can be or include the hash of all data recorded to the blockchain that includes a hash of the recorded data of the new block and a hash of all data recorded to blocks of the blockchain prior to generation of the new block.

In some embodiments, the computing devices of a vehicle and a traffic control device (e.g., see computing devices 110 and 112) are peer nodes in a peer-to-peer network, such as a network that supports blockchain 800. In such embodiments each of the devices can store, by a respective storage system, a copy of the recorded data of a block of the blockchain such as the new block 802 and previous blocks 804, 806, and 808. As shown block 808 was generated and occurs immediately prior to new block 802. Each of the blocks can include data from one or more transactions associated with the vehicle accident. The information included in exploded depiction of block 802 is just one of many examples of information that a block may contain. Also, it is to be understood, that one block could be associated with multiple vehicles, multiple traffic control devices, one or more computing nodes of the peer-to-peer network, or any combination thereof.

Figure 9A:
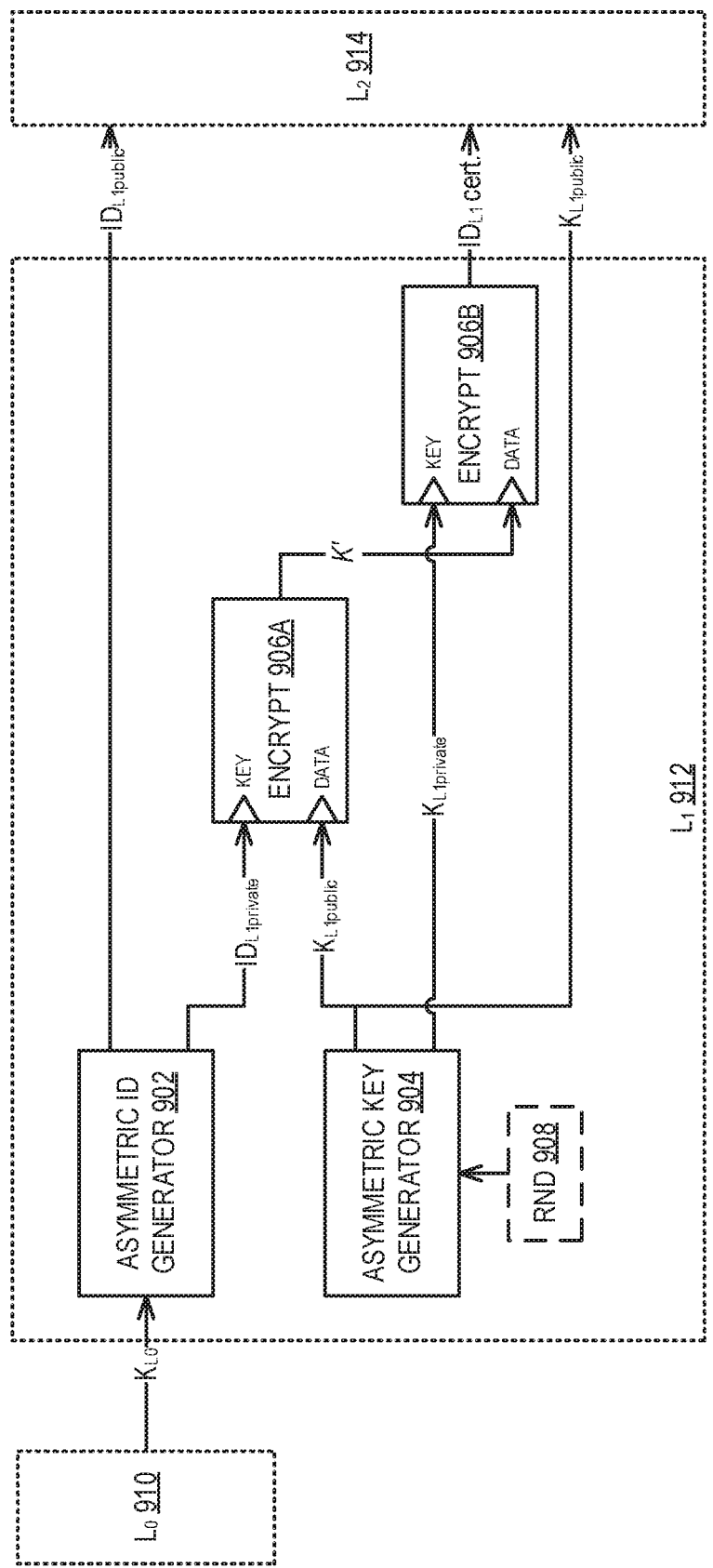
FIG. 9A illustrates an apparatus or non-transitory computer readable storage medium for generating a triple according to some embodiments.

FIG. 9A illustrates an apparatus or non-transitory computer readable storage medium for generating a triple according to some embodiments. The triple can include a public identifier of a party (such as a vehicle or a traffic control device), a public key of the party, and/or a certificate of the party. The triple can be found in the messages and communications described herein (e.g., see FIGS. 6 and 7).

As illustrated, the $L_0$ software 910 and $L_1$ software 912 operate on an identity composition device. The identity composition device can be a part of any one of the computing devices described herein. The $L_0$ code 910 includes firmware executing in ROM of the identity composition device. The $L_0$ code 910 is responsible for generating a first key ($K_{L0}$) (also referred to as a fuse-derived secret, FDS) according to the following formula: FDS=$K_{L0}$=KDF (UDS, HASH (identity of $L_1$)), where KDF is a one-way function such as an HMAC-SHA256 function, UDS is a unique device secret set during manufacture of the device operating the $L_0$ code 910, HASH includes a second one-way function such as a SHA256 function, and the identify of $L_1$ includes host configuration parameters of the $L_1$ code 912.

The $L_0$ code 910 exports KLO to the $L_1$ code 912 which is then used to generate a triple representing the $L_1$ code 912. This triple is then exported by the $L_1$ code 912 to the $L_2$ code 914. As discussed, the $L_2$ code 914 can include code executing on an external device or, in some embodiments, a remote device. For example, the $L_0$ code 910 and $L_1$ code 912 can execute on a first party while the $L_2$ 914 can execute on a separate party.

Generally, as described, the $L_1$ code 912 is responsible for generating keys (referred to as "alias keys") and a triple for the $L_1$ code 912 itself.

As illustrated, the $L_1$ code 912 generates an identifier for the $L_1$ code 912 via an asymmetric identifier generator 902. The generator 902 takes the $K_{L0}$ key as a seed input and outputs a deterministic public key ($ID_{L1public}$) and private key ($ID_{L1private}$). The $L_1$ code 912 exports the public key ($ID_{L1public}$) to the $L_2$ code 914, the usage of which will be described in the description of FIG. 9B.

Additionally, the $L_1$ code 912 generates a second key pair using a second asymmetric key generator 904. This key generator 904 takes a random number generated the random number generator 908 as a seed input and outputs a second deterministic public key ($K_{L1public}$) and private key ($K_{L1private}$). The $L_1$ code 912 exports the public key ($K_{L1public}$) to the $L_2$ code 914, the usage of which will be described in the description of FIG. 9B.

The $L_1$ code 912 additionally employs a double-encryption technique for generating the ID certificate portion of the triple exported to the $L_2$ code 914. Specifically, the $L_1$ code 912 first encrypts the $K_{L1public}$ key using the $ID_{L1public}$ key as the encryption key using a first encryption module 906A, generating encrypted ciphertext K'. This ciphertext is then used as the data supplied to a second encryption module 906B while the $K_{L1private}$ generated by the second generator 904 is used as the encryption key. The result of the second encryption module 906B is a doubly-encrypted ciphertext K" which is exported as the $ID_{L1}$ certificate. The specific choice of encryption algorithm (and corresponding decryption algorithm in FIG. 9B) is not limited in the disclosure.

Figure 9B:
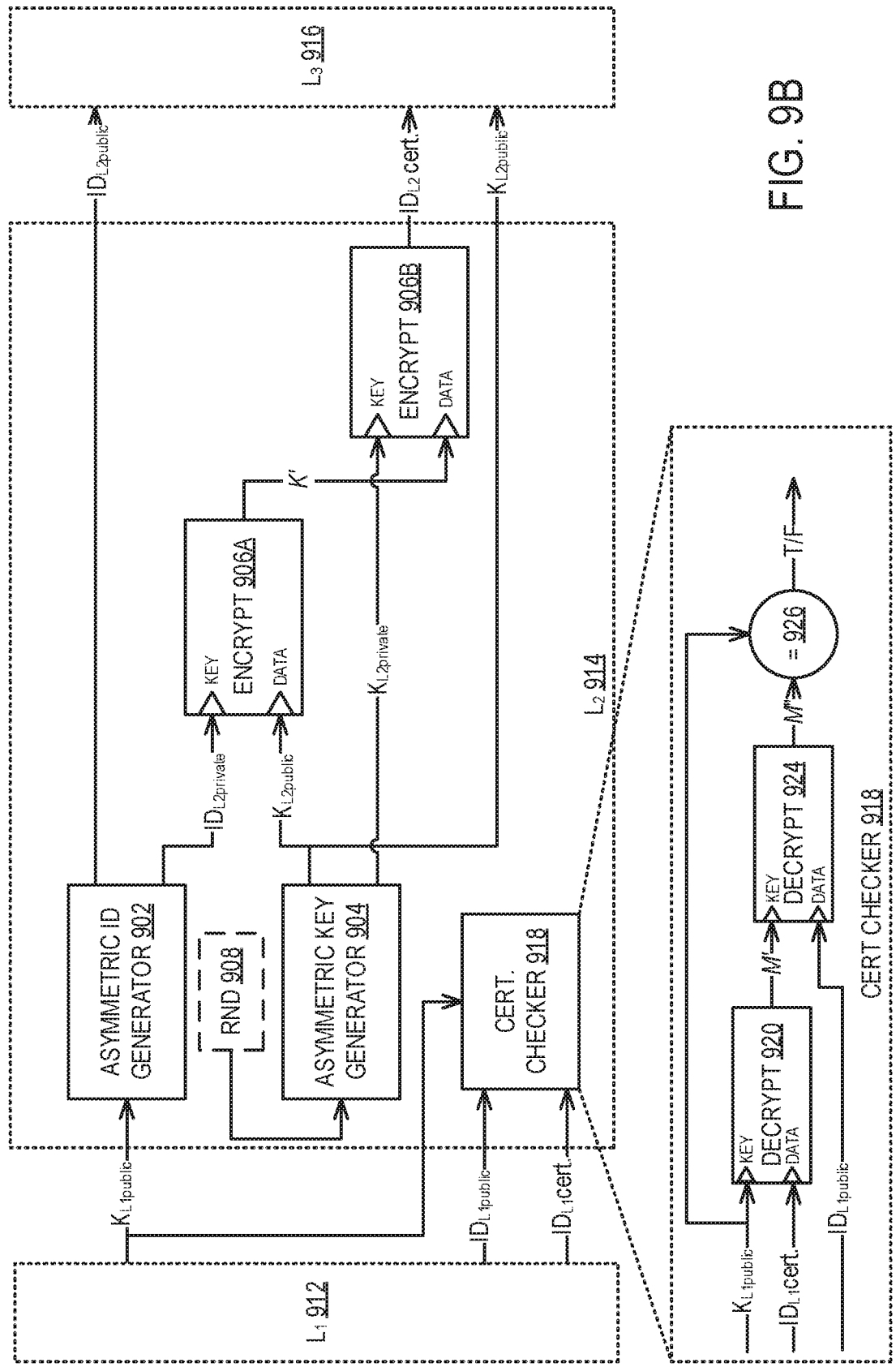
FIG. 9B illustrates an apparatus or non-transitory computer readable storage medium for verifying a triple and generating a second layer triple according to some embodiments.

FIG. 9B illustrates an apparatus or non-transitory computer readable storage medium for verifying the triple and generating a second layer triple according to some embodiments. The figure illustrated in FIG. 9B illustrates the operation of $L_2$ code 914. However, the operations described herein can be generalized for any layer including and beyond the $L_2$ code 914 (e.g., $L_3$ code 916).

In the illustrated embodiment, the $L_2$ code 914 receives a triple from $L_1$ code 912, generated as described in FIG. 9A. $L_2$ code 914 performs operations similar to that of $L_1$ code 912 with respect to generating a $L_2$ triple and those details are not repeated herein but are incorporated by reference for identically numbered elements. One notable difference in the triple-generation circuity or software is that the first generator is seeded with the $K_{L1public}$ value generated by the $L_1$ code 912 and not the value of $K_{L0}$ (the fuse-derived secret) as described in FIG. 9A.

Additionally, the $L_2$ code 914 includes a certificate checker 918 which may be implemented in hardware (i.e., a dedicated circuit) or in software or firmware. Details of the certificate checker 918 are shown in exploded view in the figure. The certificate checker 918 verifies the authenticity of the triple received from the $L_1$ code 912. In some embodiments, the certificate checker 918 acts as a gating function to the remaining components (i.e., preventing the generation of an $L_2$ triple if the triple is not valid).

As illustrated, the certificate checker 918 decrypts the $ID_{L1}$ certificate using the $K_{L1}$ public key via first decryption module 920. The resulting key M' is then used as the key for a second decryption module 924 which use the key M' to decrypt the $ID_{L1}$ public key. Finally, the resulting plaintext M'' is compared to the original public key ($K_{L1public}$) via comparator 926. If the result of the comparator is positive, the triple is confirmed as valid. If not, the triple is marked as invalid.

In the illustrated embodiment, the certificate checker 918 can execute independently of the triple generation circuity/software 902, 904, 906A-B. In this manner, triples of various entities can be verified by the $L_2$ code 914.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
in response to a vehicle having an accident:
receiving, at a computing node in a peer-to-peer network of computing nodes, data about the accident, wherein the data is collected by a machine external of the vehicle;
generating, in the computing node, a record of the data;
storing, in persistent storage at the computing node, a copy of the record; and
transmitting the record from the computing node via peer-to-peer connections to computing nodes in the peer-to-peer network, wherein when receiving the record, each of the computing nodes in the peer-to-peer network is configured to store a copy of the record as a block of a blockchain ledger and broadcast the record to one or more additional computing nodes in the peer-to-peer network to cause the one or more additional computing nodes to store one or more additional copies of the record; and
in response to an inquiry about the accident at the computing node:
providing, at the computing node, the record; and
participating, by the computing node, in a determination of a network consensus in the peer-to-peer network about the record, wherein each of the computing nodes in the peer-to-peer network is configured to determine a vote for a validity of the record based on copies of records in that each computing node, wherein the validity of the record is determined based on the votes;
wherein the validity of the record is determined based on a majority of the votes or the votes reaching a number that exceeds a threshold number of nodes confirming the validity of the record;
wherein the validity of the record is determined further based on a digital signature in the record being a verified digital signature, and further wherein the computing nodes in the peer-to-peer network are configured to determine the validity of the record based on the digital signature before storing the copy of the record, wherein the digital signature is from the machine external of the vehicle.

2. The method of claim 1, wherein the receiving of the data, at the computing node, comprises receiving the data over a communications network.

3. The method of claim 1, wherein the data is collected by the vehicle.

4. The method of claim 3, wherein the vehicle comprises the computing node.

5. The method of claim 3, wherein the receiving of the data, at the computing node, comprises receiving the data over a communications network from the vehicle.

6. The method of claim 1, wherein the machine comprises the computing node.

7. The method of claim 1, wherein the receiving of the data, at the computing node, comprises receiving the data over a communications network from the machine.

8. The method of claim 1, wherein the data is collected by the vehicle and a machine external of the vehicle.

9. The method of claim 8, wherein the machine is another vehicle in the accident.

10. The method of claim 9, wherein the record is a first record, wherein the computing node is a first computing node, and wherein the vehicle comprises the first computing node and the other vehicle in the accident comprises a second computing node in the peer-to-peer network and wherein the method further comprises:
receiving, at the second computing node, second data about the accident:
generating, in the second computing node, a second record of the second data;
storing, in persistent storage at the second computing node a copy of the second record; and
transmitting the second record from the second computing node via peer-to-peer connections to computing nodes in the peer-to-peer network, wherein when receiving the second record, each of the computing nodes in the peer-to-peer network is configured to store a copy of the second record and broadcast the second record to one or more additional computing nodes in the peer-to-peer network to cause the one or more additional computing nodes to store one or more additional copies of the second record; and
in response to an inquiry about the accident at the second computing node:
providing, at the second computing node, the second record; and
participating, by the second computing node, in a determination of a network consensus in the peer-to-peer network about the second record, wherein each of the computing nodes in the peer-to-peer network is configured to determine a vote for a validity of the second record based on copies of records in that each computing node, wherein the validity of the second record is determined based on the votes.

11. The method of claim 10, wherein the validity of the second record is determined based on a majority of the votes.

12. The method of claim 10, wherein the validity of the second record is determined based on the votes reaching a number that exceeds a threshold number of nodes confirming the validity of the second record.

13. The method of claim 1, wherein at least part of the received data is derived from or comprises data collected by the vehicle and stored in memory of an event data recorder (EDR) of the vehicle or a data storage device communicatively coupled to the EDR before the accident.

14. The method of claim 1, wherein the data about the accident is a preselected subset of data from a larger dataset, and wherein the selection of certain parts of the larger dataset for the preselected subset is according to size of each one of the certain parts being below a predetermined size threshold.

15. A method comprising:
receiving, by a computing device of a vehicle, data stored in memory of an event data recorder (EDR) of the vehicle or a data storage device communicatively coupled to the EDR;
selecting, by the computing device, certain parts of the received data according to size of each part of the certain parts; and
sending over a communications network, by the computing device, the selected parts of the data to a computing node in a peer-to-peer network of computing nodes so that the computing node generates a record of the selected parts of the data and stores, in persistent storage a copy of the record as a block of a blockchain ledger so that the computing node is configured to transmit the record via peer-to-peer connections to computing nodes in the peer-to-peer network at will or upon requests by the computing nodes;
wherein the receiving of the stored data by the computing device of the vehicle only occurs when the computing device predicts that the vehicle is about to be in an accident, when the computing device determines that the vehicle is in an accident, or when the computing device determines that the vehicle has been in an accident within a predetermined period of time, wherein the computing device determines that the vehicle is about to be in the accident, is in the accident, or has been in the accident based at least in part on external data received from a machine external of the vehicle; and
wherein the computing device only sends the selected parts of the data after determining a validity of the selected parts of the data, wherein the validity is determined at least in part based on a digital signature of the data, wherein the digital signature is from the machine external of the vehicle.

16. A non-transitory computer-readable storage medium tangibly encoded with computer-executable instructions, that when executed by a processor of a computing node in a peer-to-peer network of computing nodes, causes the processor to perform a method, the method comprising:
in response to a vehicle having an accident:
receiving data about the accident, wherein the data is collected by a machine external of the vehicle;
generating a record of the data;
storing, in persistent storage at the computing node, a copy of the record; and
transmitting the record from the computing node via peer-to-peer connections to computing nodes in the peer-to-peer network, wherein when receiving the record, each of the computing nodes in the peer-to-peer network is configured to store a copy of the record as a block of a blockchain ledger and broadcast the record to one or more additional computing nodes in the peer-to-peer network to cause the one or more additional computing nodes to store one or more additional copies of the record; and
in response to an inquiry at the computing node, by a requester, about the accident:
providing the record to the requester; and participating in a determination of a network consensus in the peer-to-peer network about the record, wherein a processor of each of the computing nodes in the peer-to-peer network is configured to determine a vote for a validity of the record based on copies of records in that each computing node, wherein the validity of the record is determined based on the votes;

wherein the validity of the record is determined based on a majority of the votes or the votes reaching a number that exceeds a threshold number of nodes confirming the validity of the record;

wherein the validity of the record is determined further based on a digital signature in the record being a verified digital signature, and wherein the digital signature is from the machine external of the vehicle.

17. The non-transitory computer-readable storage medium of claim 16, wherein the machine external of the vehicle observed aspects of the accident.

18. The non-transitory computer-readable storage medium of claim 17, wherein the machine external of the vehicle is a black box recorder or a traffic control device.

19. An apparatus comprising:

a computing node in a peer-to-peer network of computing nodes, wherein a processor of the computing node is configured to, in response to a vehicle having an accident:

receive data about the accident, wherein the data is collected by a machine external of the vehicle;

generate a record of the data;

store, in persistent storage at the computing node, a copy of the record; and transmit the record from the computing node via peer-to-peer connections to computing nodes in the peer-to-peer network, wherein upon receiving the record, each of the computing nodes in the peer-to-peer network is configured to store a copy of the record as a block of a blockchain ledger and broadcast the record to one or more additional computing nodes in the peer-to-peer network to cause the one or more additional computing nodes to store one or more additional copies of the record; and wherein the processor is further configured to, in response to an inquiry at the computing node, by a requester, about the accident:

provide the record to the requester; and participate in a determination of a network consensus in the peer-to-peer network about the record, wherein a processor of each of the computing nodes in the peer-to-peer network is configured to determine a vote for a validity of the record based on copies of records in that each computing node, wherein the validity of the record is determined based on the votes;

wherein the validity of the record is determined based on a majority of the votes or the votes reaching a number that exceeds a threshold number of nodes confirming the validity of the record;

wherein the validity of the record is determined further based on a digital signature in the record being a verified digital signature, and wherein the digital signature is from the machine external of the vehicle.

20. A system comprising:

a first computing node in a peer-to-peer network of computing nodes, wherein a first processor of the first computing node is configured to, in response to a vehicle having an accident:

receive data about the accident, wherein the data is collected by a machine external of the vehicle;

generate a record of the data;

store, in persistent storage at the first computing node, a copy of the record; and transmit the record from the first computing node via peer-to-peer connections to computing nodes in the peer-to-peer network, wherein upon receiving the record, each of the computing nodes in the peer-to-peer network is configured to store a copy of the record as a block of a blockchain ledger and broadcast the record to one or more additional computing nodes in the peer-to-peer network to cause the one or more additional computing nodes to store one or more additional copies of the record; and a second computing node in the peer-to-peer network of computing nodes, wherein a second processor of the second computing node is further configured to, in response to an inquiry at the second computing node, by a requester, about the accident:

provide the record to the requester; and participate in a determination of a network consensus in the peer-to-peer network about the record, wherein a processor of each of the computing nodes in the peer-to-peer network is configured to determine a vote for a validity of the record based on copies of records in that each computing node, wherein the validity of the record is determined based on the votes;

wherein the validity of the record is determined based on a majority of the votes or the votes reaching a number that exceeds a threshold number of nodes confirming the validity of the record;

wherein the validity of the record is determined further based on a digital signature in the record being a verified digital signature, and wherein the digital signature is from the machine external of the vehicle.

* * * * *